(12) United States Patent
Sekharan et al.

(10) Patent No.: US 11,288,273 B2
(45) Date of Patent: Mar. 29, 2022

(54) MACHINE LEARNING BASED PLUG-IN FOR PROVIDING ACCESS TO CLOUD-BASED ANALYTICS ENGINE

(71) Applicant: SAP SE, Walldorf (DE)

(72) Inventors: Satishkumar Sekharan, Coquitlam (CA); Gerrit Simon Kazmaier, Schwetzingen (DE); Sarah Menard, Vancouver (CA)

(73) Assignee: SAP SE, Walldorf (DE)

( * ) Notice: Subject to any disclaimer, the term of this patent is extended or adjusted under 35 U.S.C. 154(b) by 363 days.

(21) Appl. No.: 16/460,865

(22) Filed: Jul. 2, 2019

(65) Prior Publication Data

US 2021/0004370 A1    Jan. 7, 2021

(51) Int. Cl.
*G06F 17/00* (2019.01)
*G06F 16/2455* (2019.01)
*G06N 20/00* (2019.01)

(52) U.S. Cl.
CPC ......... *G06F 16/2455* (2019.01); *G06N 20/00* (2019.01)

(58) Field of Classification Search
CPC .... G06F 16/2455; G06F 16/248; G06F 16/26; G06N 20/00; G06N 20/10; G06N 20/20; G06N 3/0445; G06N 7/005
See application file for complete search history.

(56) References Cited

U.S. PATENT DOCUMENTS

| | | | | |
|---|---|---|---|---|
| 8,924,410 B2* | 12/2014 | Bierner | ............... | G06F 16/3322 707/768 |
| 10,296,848 B1* | 5/2019 | Mars | ................... | G06N 3/0454 |
| 10,303,978 B1* | 5/2019 | Kang | .................... | G06N 3/088 |
| 2018/0307687 A1* | 10/2018 | Natkin | ............. | G06F 16/24578 |

* cited by examiner

*Primary Examiner* — Greta L Robinson
(74) *Attorney, Agent, or Firm* — Mintz Levin Cohn Ferris Glovsky and Popeo, P.C.

(57) ABSTRACT

A method may include generating, based on text associated with an interaction between a user and an application, a query corresponding to an intent of the interaction. The query may be generated by applying one or more machine learning models trained to determine the intent of the interaction and to generate the query by mapping, to a corresponding slot in a template query, one or more named entities included in the first text. The query may be sent to an analytics engine not associated with the application to retrieve, from a database associated with the analytics engine, data relevant to the interaction between the user and the application. A data presentation providing a visual representation of the data retrieved from the database may be generated for display at a client associated with the user. Related systems and articles of manufacture are also provided.

20 Claims, 9 Drawing Sheets

MACHINE LEARNING BASED PLUG-IN FOR PROVIDING ACCESS TO CLOUD-BASED ANALYTICS ENGINE

TECHNICAL FIELD

The subject matter described herein relates generally to database processing and more specifically to a cloud-based analytics engine operating on data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for accessing a cloud-based analytics engine. In one aspect, there is provided a system. The system may include at least one data processor and at least one memory. The at least one memory may store instructions that result in operations when executed by the at least one data processor. The operations may include: generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text; sending, to an analytics engine, the query to at least retrieve, from a database associated with the analytics engine, data relevant to the interaction between the user and the application; and generating, for display at a client associated with the user, a data presentation providing a visual representation of at least a portion of the data retrieved from the database.

In some variations, one or more features disclosed herein including the following features may optionally be included in any feasible combination. The one or more machine learning models may include a first machine learning model trained to determine the intent of the interaction between the user and the application. The one or more machine learning models may further include a second machine learning model trained to map, to the corresponding slot in the template query, the one or more named entities included in the first text. The first machine learning model may be a support vector machine and/or a neural network. The second machine learning model may be a maximum entropy Markov model, a conditional random fields model, and/or a recurrent neural network.

In some variations, the one or more machine learning models may include a machine learning model that is jointly trained to determine the intent of the interaction between the user and the application and to map, to the corresponding slot in the template query, the one or more named entities included in the first text. The machine learning model may be an attention-based bidirectional recurrent neural network.

In some variations, the one or more machine learning models is further trained to determine the intent of the interaction between the user and the application by at least identifying a category for each of the one or more named entities included in the first text. The category may include a name, an organization, a location, a time expression, a medical code, a quantity, a monetary value, or a percentage.

In some variations, the one or more machine learning models may be trained based at least on training data. The training data may include a second text associated with a first tag indicating a ground truth category of a named entity included in the second text and a second tag indicating a ground truth intent of the second text.

In some variations, the data presentation may include a chart, a graph, a table, and/or a diagram.

In some variations, the application may include a web application, an email client, or a message client. The application may not be associated with the analytics engine.

In another aspect, there is provided a method for accessing a cloud-based analytics engine. The method may include: generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text; sending, to an analytics engine, the query to at least retrieve, from a database associated with the analytics engine, data relevant to the interaction between the user and the application; and generating, for display at a client associated with the user, a data presentation providing a visual representation of at least a portion of the data retrieved from the database.

In some variations, one or more features disclosed herein including the following features may optionally be included in any feasible combination. The one or more machine learning models may include a first machine learning model trained to determine the intent of the interaction between the user and the application. The one or more machine learning models may further include a second machine learning model trained to map, to the corresponding slot in the template query, the one or more named entities included in the first text. The first machine learning model may be a support vector machine and/or a neural network. The second machine learning model may be a maximum entropy Markov model, a conditional random fields model, and/or a recurrent neural network.

In some variations, the one or more machine learning models may include a machine learning model that is jointly trained to determine the intent of the interaction between the user and the application and to map, to the corresponding slot in the template query, the one or more named entities included in the first text. The machine learning model may be an attention-based bidirectional recurrent neural network.

In some variations, the one or more machine learning models is further trained to determine the intent of the interaction between the user and the application by at least identifying a category for each of the one or more named entities included in the first text. The category may include a name, an organization, a location, a time expression, a medical code, a quantity, a monetary value, or a percentage.

In some variations, the method may further include training, based at least on training data, the one or more machine learning models. The training data may include a second text associated with a first tag indicating a ground truth category of a named entity included in the second text and a second tag indicating a ground truth intent of the second text.

In some variations, the application may include a web application, an email client, or a message client. The application may not associated with the analytics engine.

In another aspect, there is provided a computer program product that includes a non-transitory computer readable storage medium. The non-transitory computer-readable storage medium may include program code that causes operations when executed by at least one data processor. The operations may include: generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text; sending, to an analytics engine, the query to at least retrieve, from a database associated with the analytics engine, data relevant to the interaction between the user and the application; and generating, for display at a client associated with the user, a data presentation providing a visual representation of at least a portion of the data retrieved from the database.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning based plug-in for accessing a cloud-based analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
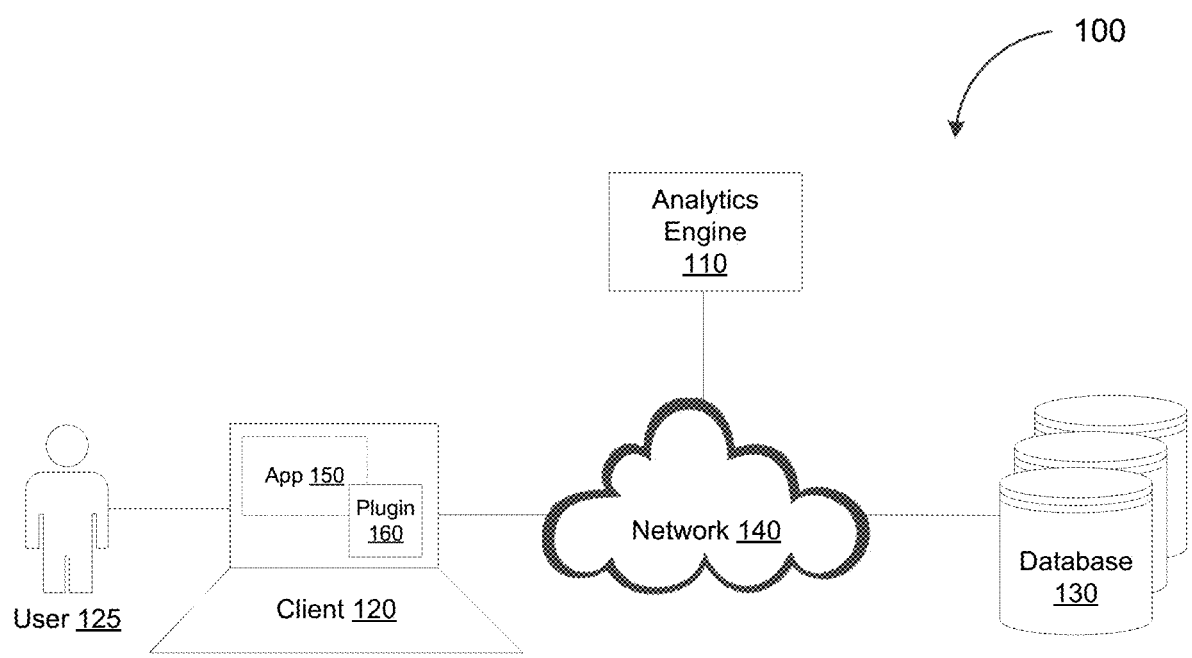
FIG. 1 depicts a system diagram illustrating an analytics system, in accordance with some example embodiments.

A cloud-based analytics engine may provide a variety of functionalities for accessing data stored in a database. For example, the cloud-based analytics engine may provide one or more software widgets for creating data presentations that provide a visual representation of at least a portion of the data stored in the database. A software widget may be displayed, at a client, as part of a graphic user interface (GUI). Moreover, a user may interact with the software widget in order to create, based on at least a portion of the data stored in the database, a corresponding data presentation such as, for example, a chart, a graph, a table, a diagram, and/or the like. The functionalities of the cloud-based analytics engine may be inaccessible to the user while the user is interacting with a third party application such as a web application, an email client, or a message client. However, the user may require access to the cloud-based analytics engine including, for example, data presentations that provide a visual representation of at least a portion of the data stored in the database.

In some example embodiments, a plug-in may be configured to provide the user access to the cloud-based analytics engine while the user is interacting with a third party application. The plug-in may be configured to generate, based at least on text associated with the user's interactions with the third party application, one or more data presentations to provide the user a visual representation of at least a portion of data from the database that is relevant to the user's interactions with the third party application. For example, the plug-in may access the cloud-based analytics engine while the user is interacting with an email client. The plug-in may generate, based at least on the content of one or more emails being accessed by the user interacting with the email client, a data presentation to provide the user a visual representation of data from the database that is relevant to the one or more emails being accessed by the user.

In order to generate the data presentation, the plug-in may generate a query to retrieve, from the database, data that is relevant to the user's interactions with the third party application. In some example embodiments, the plug-in may generate the query based at least on a context of the user's interaction with the third party application. The context of the user's interaction with the third party application may be identified by applying one or more machine learning models including, for example, support vector machines (SVMs), convolutional neural networks, recurrent neural networks, conditional random fields (CRFs), and maximum-entropy Markov models. For example, the plug-in may apply the one or more machine learning models to an email being accessed by the user interacting with the email client.

The one or more machine learning models may be trained to identify the context of the user's interaction based at least on the text that is associated with the user's interaction with the application. For instance, the one or more machine learning models may determine the intent of the user's interaction with the application including by identifying the categories of named-entities included in the email such as names, organizations, locations, time expressions, medical codes, quantities, monetary values, percentages, and/or the like. Furthermore, the one or more machine learning models may generate a query by at least slot filling a template query, which includes mapping, based at least on the intent of the email, at least some of the named entities included in the email to the corresponding slots in the template query. The plug-in may retrieve data relevant to the content of the email from the database by at least sending, to the cloud-based analytics engine, the resulting query. For example, the plug-in may communicate with the cloud-based analytics engine through an application programming interface (API) such as representational state transfer (REST), simple object access protocol (SOAP), and/or the like.

FIG. 1 depicts a system diagram illustrating an analytics system 100, in accordance with some example embodiments. Referring to FIG. 1, the analytics system 100 may include an analytics engine 110, a client 120, and a database 130. As shown in FIG. 1, the analytics engine 110, the client 120, and the database 130 may be communicatively coupled via a network 140. It should be appreciated that the client 120 may be any processor-based device including, for example, a smartphone, a tablet computer, a wearable apparatus, a virtual assistant, an Internet-of-Things (IoT) appliance, and/or the like. The network 140 may be any wired and/or wireless network including, for example, a wide area network (WAN), a local area network (LAN), a virtual local area network (VLAN), a public land mobile network (PLMN), the Internet, and/or the like.

The analytics engine 110 may provide a variety of functionalities for accessing data stored in the database 130. For example, the analytics engine 110 may provide one or more software widgets that a user 125 at the client 120 may interact with to create data presentations, However, the functionalities of the analytics engine 110 may be inaccessible to the user 125 while the user 125 is interacting with an application 150, which may be a third party application not associated with the analytics engine 110. For example, the application 150 may be a web application, an email client, or a message client without access to the analytics engine 110. As such, in some example embodiments, the analytics engine 110 may be associated with a plug-in 160 configured to provide, to the user 125, access to the analytics engine 110 while the user 125 is interacting with the application 150. The plug-in 160 may be a software component configured to add one or more features to the application 150. For example, the plug-in 160 may provide access to the analytics engine 110 from the application 150, which is not associated with the analytics engine 110. The plug-in 160 may communicate with the analytics engine 110 through an application programming interface (API) including, for example, representational state transfer (REST), simple object access protocol (SOAP), and/or the like.

Figure 2A:
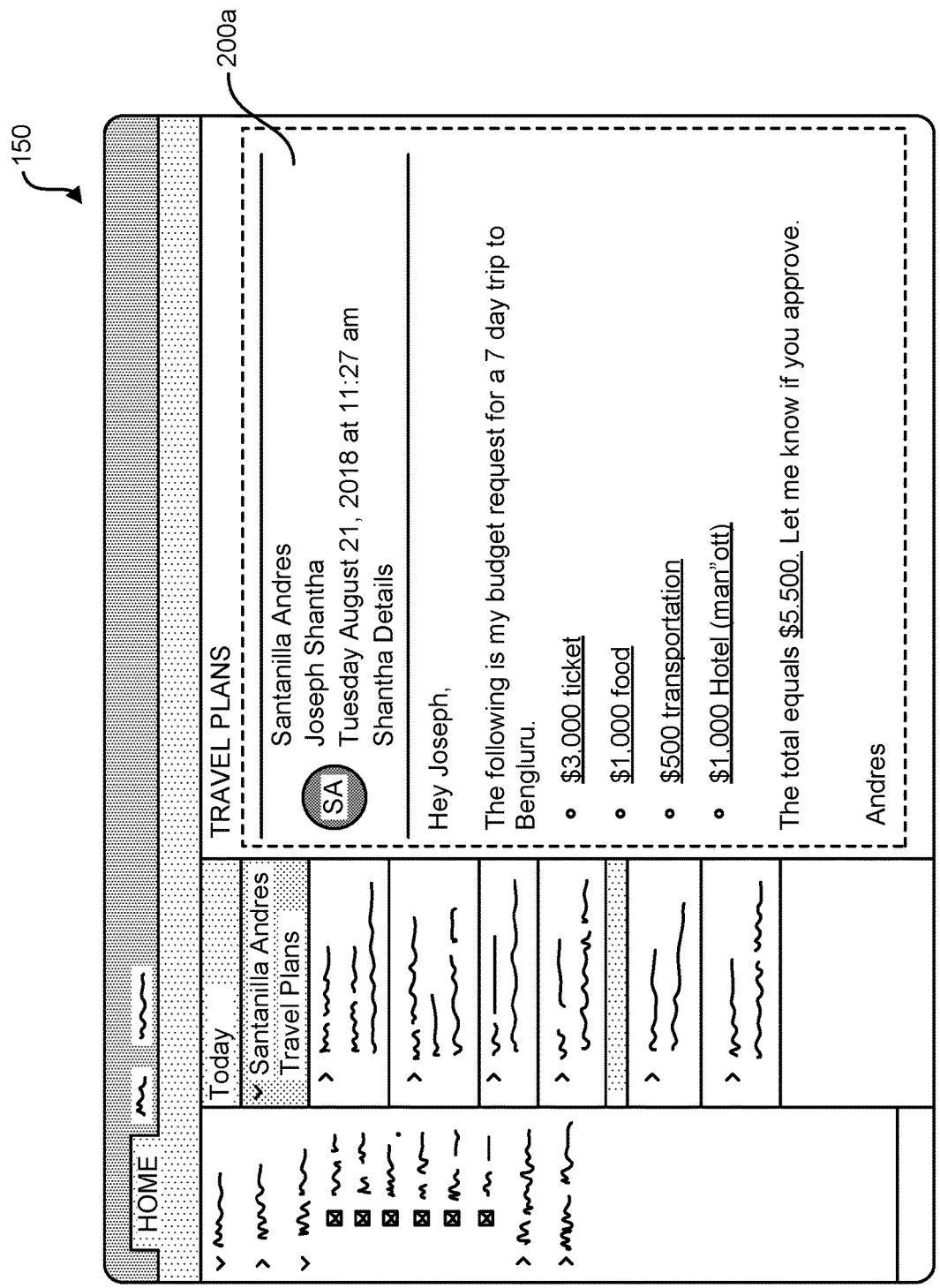
FIG. 2A depicts an example of an interaction with an application, in accordance with some example embodiments.

To further illustrate, FIG. 2A depicts an example of an interaction with the application 150, in accordance with some example embodiments. In the example shown in FIG. 2A, the application 150 may be an email client not associated with the analytics engine 110. The user 125 at the client 120 may interact with the application 150 by at least accessing a first email 200a received via the application 150. For example, the user 125 may access the first email 200a by at least reading the first email 200a be displayed at the client 120 as part of a graphic user interface (GUI).

Figure 2B:
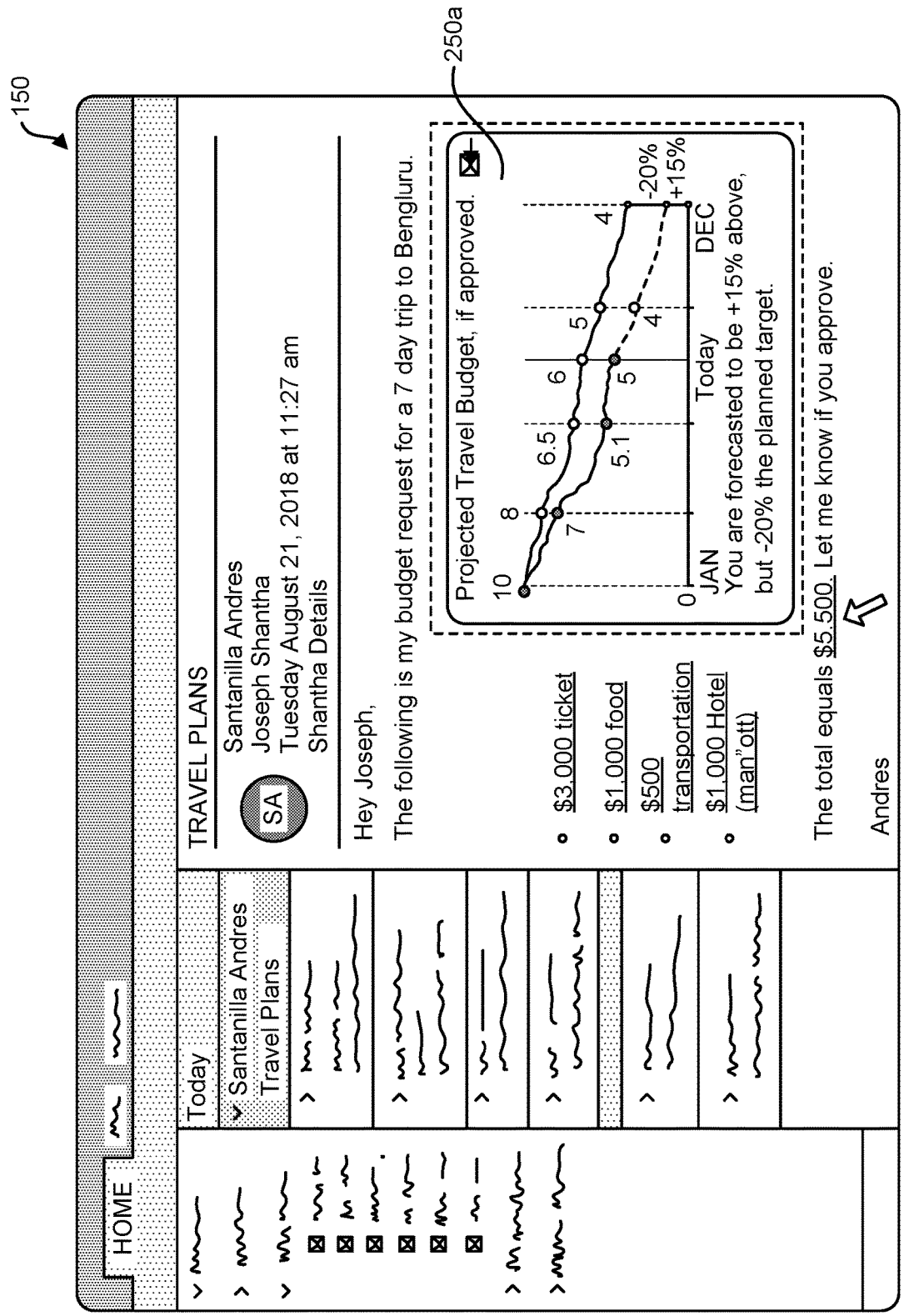
FIG. 2B depicts an example of a plug-in accessing an analytics engine in response to an interaction with an application, in accordance with some example embodiments.

FIG. 2B depicts an example of the plug-in 160 accessing the analytics engine 110 in response to an interaction with the application 150, in accordance with some example embodiments. In the example shown in FIG. 2B, the plug-in 160 may respond to the user 125 interacting with the application 150 to access the first email 200a by at least accessing the analytics engine 110 to retrieve, from the database 130, data relevant to the content of the first email 200a. Furthermore, the plug-in 160 may generate, based on at least a portion of the data retrieved from the database 130, a first data presentation 250a. The first data presentation 250a may be a chart, a graph, a table, a diagram, and/or the like, that provides a visual representation of at least the portion of the data retrieved from the database 130.

Figure 2C:
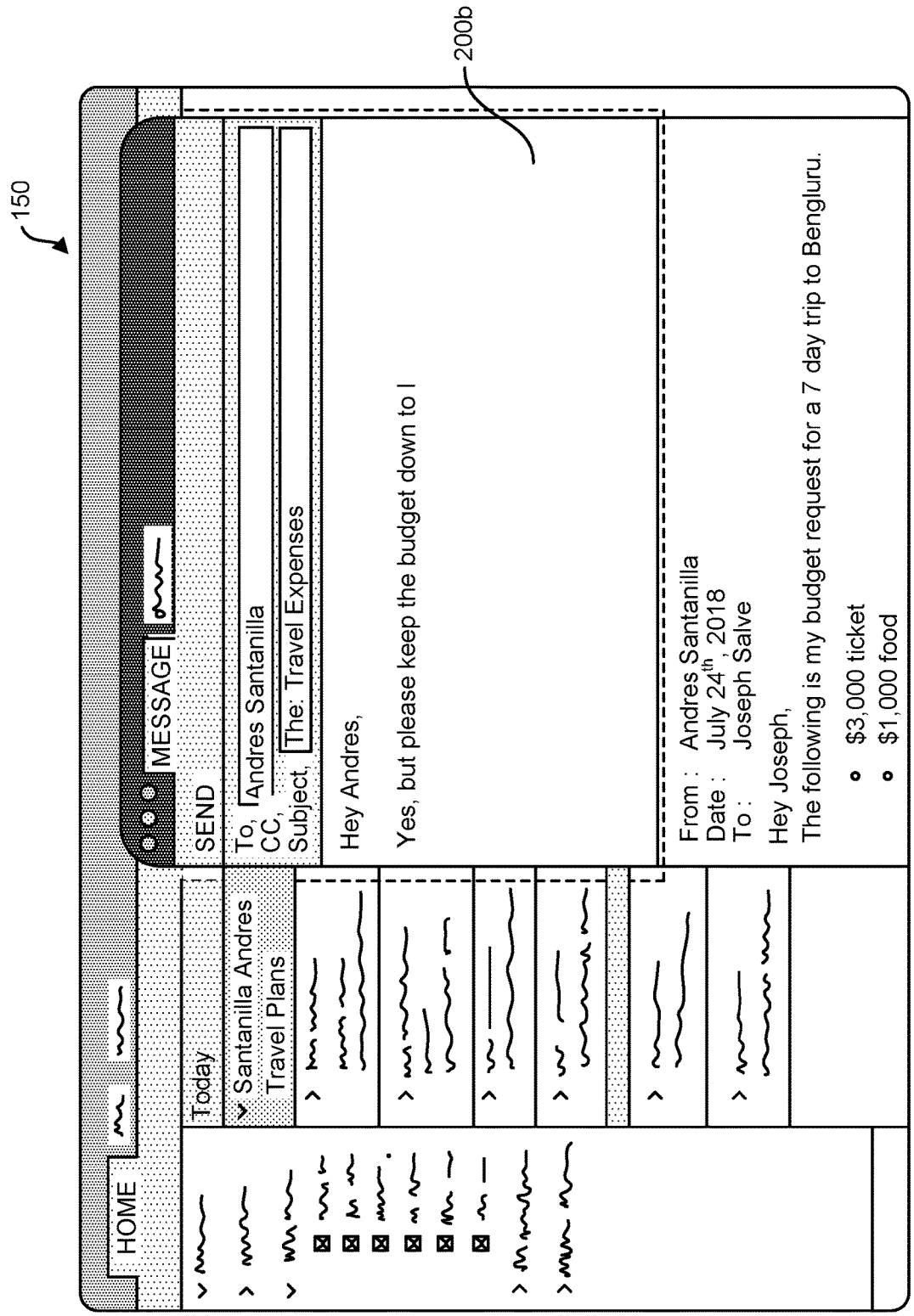
FIG. 2C depicts another example of an interaction with an application, in accordance with some example embodiments.

FIG. 2C depicts another example of an interaction with the application 150, in accordance with some example embodiments. In the example shown in FIG. 2C, the user 125 at the client 120 may interact with the application 150 to respond to the first email 200a by at least composing a second email 200b, which may also be displayed at the client 120 as part of a graphic user interface (GUI).

Figure 2D:
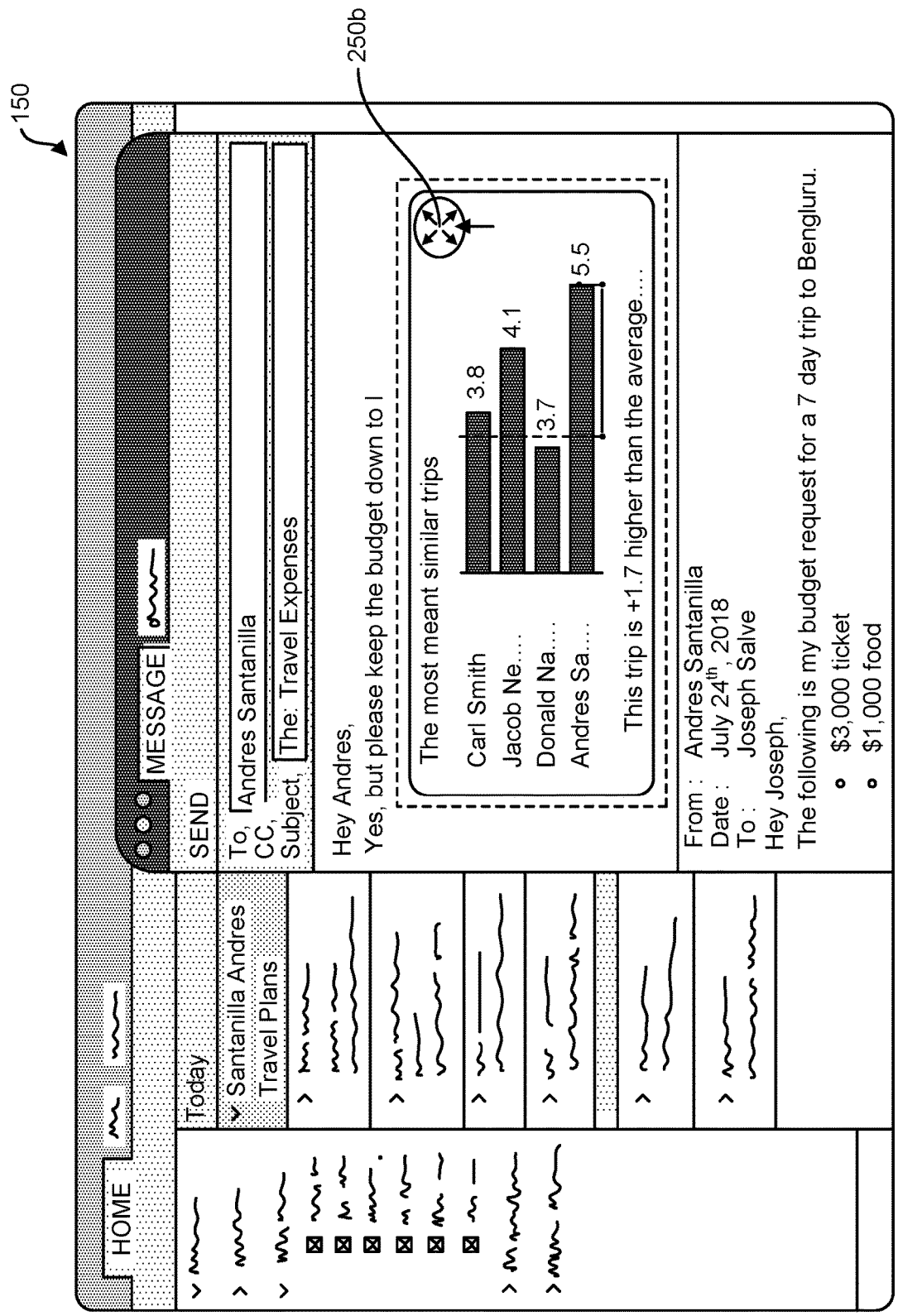
FIG. 2D depicts another example of a plug-in accessing an analytics engine in response to an interaction with an application, in accordance with some example embodiments.

FIG. 2D depicts another example of the plug-in 160 accessing the analytics engine 110 in response to an interaction with the application 150, in accordance with some example embodiments. In the example shown in FIG. 2D, the plug-in 160 may respond to the user 125 interacting with the application 150 to compose the second email 200b by at least accessing the analytics engine 110 to retrieve, from the database 130, data relevant to the content of the first email 200a and/or the second email 200b. Furthermore, the plug-in 160 may generate, based on at least a portion of the data retrieved from the database 130, a second data presentation 250b. As shown in FIG. 2B, the first data presentation 250a may be a chart, a graph, a table, a diagram, and/or the like, that provides a visual representation of at least the portion of the data retrieved from the database 130.

In order to retrieve data from the database 130 that is relevant to the user 125 interacting with the application 150, the plug-in 160 may be configured to determine a context of the interaction between the user 125 and the application 150. Furthermore, the plug-in 160 may generate a query to retrieve, from the database 130, at least a portion of the data relevant to the interaction between the user 125 and the application 150. The plug-in 160 may generate the query based at least on the context of the interaction between the user 125 and the application 150. According to some example embodiments, the plug-in 160 may determine the context of the interaction between the user 125 and the application 150 based at least on a text associated with the interaction between the user 125 and the application 15. As such, in the examples shown in FIGS. 2A-D, the plug-in 160 may determine, based at least on the content of the first email 200a and/or the second email 200b, the context of the interaction between the user 125 and the application 150. The plug-in 160 may further generate a query to retrieve, from the database 130, at least a portion of the data relevant to the context of the interaction between the user 125 and the application. As noted, the plug-in 160 may generate, based at least on the data retrieved from the database 130, the first data presentation 250a and the second data presentation 250b.

In some example embodiments, the plug-in 160 may determine the context of the interaction between the user 125 and the application 150 by at least applying, to a text associated with the interaction between the user 125 and the application 150, one or more machine learning models. The text may include a sequence of tokens, at least some of which may correspond to named entities. As used here, a "named entity" may refer to an object or an instance of an object that can be denoted with a proper name. Examples of named entities may include persons, locations, organizations, products, and/or the like. Accordingly, each named entity included in the text may be associated with a category including, for example, names, organizations, locations, time expressions, medical codes, quantities, monetary values, percentages, and/or the like.

For example, the plug-in 160 may apply, to the content of the first email 200a and/or the second email 200b, one or more machine learning models trained to identify the context of the interaction between the user 125 and the application 150. The one or more machine learning models may determine the intent of the first email 200a and/or the second email 200b including by identifying the categories of named entities included in the first email 200a and/or the second email 200b. Moreover, the one or more machine learning models may generate a query by at least slot filling a template query with at least some of the named entities included in the first email 200a and/or the second email 200b. For instance, the one or more machine learning models may map, based at least on the intent of the first email 200a and/or the second email 200b, the named entities included in the first email 200a and/or the second email 200b to the corresponding slots in the template query. The plug-in 160 may send the resulting query sent to the analytics engine 110 in order to retrieve, from the database 130, data relevant to the context of the interaction between the user 125 and the application 150.

Figure 3:
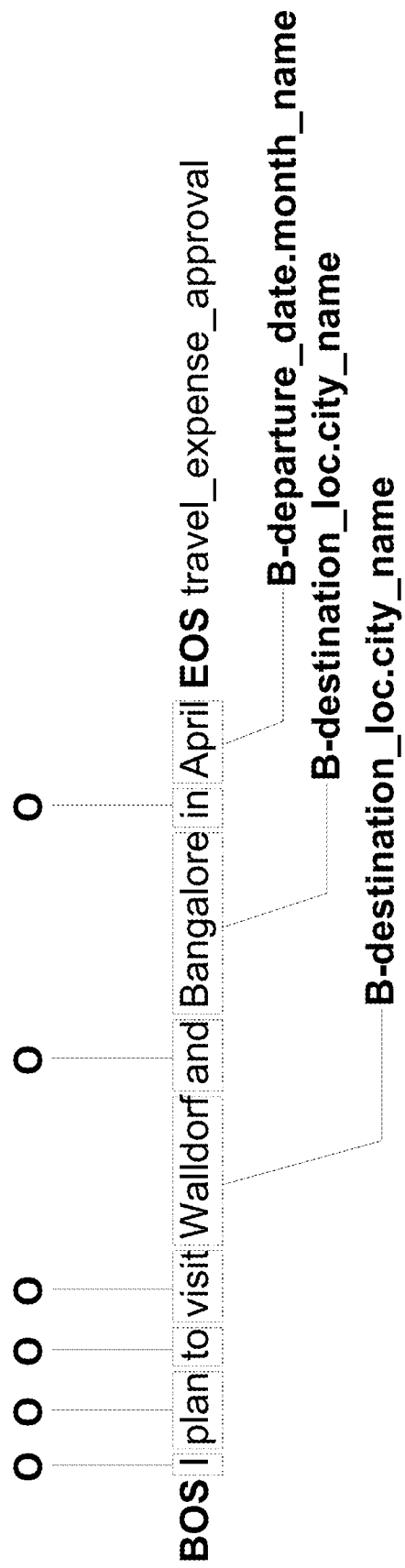
FIG. 3 depicts an example of text associated with an interaction between a user and an application, in accordance with some example embodiments.

To further illustrate, FIG. 3 depicts an example of text associated with the interaction between the user 125 and the application 150, in accordance with some example embodiments. The example of the text shown in FIG. 3 may include a string of tokens that appears as part of the first email 200a and/or the second email 220b being accessed by the user 125 interacting with the application 150. Referring to FIG. 3, the plug-in 160 may identity the tokens corresponding to named entities included in the text associated with the interaction between the user 125 and the application 150. Furthermore, the plug-in 160 may assign, to each token corresponding to a named entity, a tag corresponding to the category of the named entity.

In the example of the text shown in FIG. 3, the tokens "Walldorf" and the token "Bangalore" may be assigned the tag "B-destination loc.city name" to indicate these tokens as corresponding to named entities belonging to the category of destination cities. Furthermore, the token "April" may be assigned the tag "B-departure date.month name" to indicate this token as corresponding to a named entity belonging to the category departure date.

As shown in FIG. 3, tokens that do not correspond to a named entity (e.g., "I," "plan," "to," "visit," "and," and "in") may be assigned a tag "O." Moreover, the plug-in 160 may determine the beginning and the end of sentence strings in the text associated with the interaction between the user 125 and the application 150 including by inserting the tag "BOS" to indicate the beginning of a sentence and the tag "EOS" to indicate the end of the sentence.

The plug-in 160 may further infer the intent of the interaction between the user 125 and the application 150 based at least on the categories of named entities included in the text associated with the interaction between the user 125 and the application 150. In the example shown in FIG. 3, the plug-in 160 may determine that the intent of the interaction between the user 125 and the application 150 is to obtain approval for travel expense. Accordingly, FIG. 3 shows the text associated with the interaction between the user 125 and the application 150 as further being assigned the corresponding label "travel_expense_approval."

In some example embodiments, the plug-in 160 may apply, to the text associated with the interaction between the user 125 and the application 150, multiple machine learning models that have been separately trained to determine the intent of the text and map the named entities included in the text to the corresponding slots in the template query. For example, the plug-in 160 may apply a first machine learning model trained to determine the intent of the interaction between the user 125 and the application 150 including by identifying the categories of named entities included in the text. Examples of the first machine learning model may include a support vector machine (SVM), a neural network, and/or the like. Furthermore, the plug-in 160 may apply a second machine learning model trained to map, based at least on the intent of the interaction between the user 125 and the application 150, the named entities included in the text to the corresponding slots in a template query. Examples of the second machine learning model may include a maximum entropy Markov model (MEMM), a conditional random fields (CRF) model, a recurrent neural network (RNN), and/or the like.

Alternatively and/or additionally, the plug-in 160 may apply a single machine learning model that is jointly trained to determine the intent of the text and map the named entities included in the text to the corresponding slots in the template query. Examples of the jointly trained machine learning model may include an attention-based bidirectional recurrent neural network. The jointly trained machine learning model may be configured to encode the tokens included in the text into a dense vector and generate, based on the vector, an output sequence mapping the named entities included in the text to a template query corresponding to the intent of the text associated with the interaction between the user 125 and the application 150.

For example, the text associated with the interaction between the user 125 and the application 150 may include a sequence of a T quantity of tokens $x=(x_1, \ldots, x_T)$, one or more of which corresponding to a named entity (e.g., a name, an organization, a location, a time expression, a medical code, a quantity, a monetary value, a percentage, and/or the like). In some example embodiments, the jointly trained machine learning model may take the sequence $x=(x_1, \ldots, x_T)$ as input and generate a forward hidden state $\vec{h}_i$ as well as a backward hidden state $\overleftarrow{h}_i$. The final hidden state $h_i$ of the jointly trained machine learning model at time i may be a concatenation of the forward hidden state $\vec{h}_i$ and the backward hidden state $\overleftarrow{h}_i$ (i.e., $[\vec{h}_i, \overleftarrow{h}_i]$).

The jointly trained machine learning model may be trained to map a named entity in the input sequence $x=(x_1, \ldots, x_T)$ to a corresponding slot in a template query denoted as $y=(y_1^s, \ldots, y_T^s)$. Accordingly, for each hidden state $h_i$, the jointly trained machine learning model may compute a slot context vector $c_i^s$ as a sum of the hidden states $h_1, \ldots, h_T$ weighted by the learned slot attention weights $a_{i,j}^s$ in accordance with Equation (1) below.

$$c_i^s = \Sigma_{j=1}^T a_{i,j}^s h_j, \tag{1}$$

The slot attention weights $a_{i,j}^s$ may be computed based on Equations (2) and (3) below.

$$\alpha_{i,j}^S = \frac{\exp(e_{i,j})}{\sum_{k=1}^T \exp(e_{i,k})}, \tag{2}$$

$$e_{i,k} = \sigma(W_{he}^S h_k), \tag{3}$$

wherein σ may denote an activation function and $W_{he}^s$ may denote a weight matrix of a feed-forward neural network.

The jointly trained machine learning model may perform, in accordance with Equation (4) below, slot filling to at least map the named entities included in the input sequence $x=(x_1, \ldots, x_T)$ to a corresponding slot in the template query denoted as $y=(y_1^s, \ldots, y_T^s)$.

$$y_i^s = \mathrm{softmax}(W_{hy}^s(h_i + c_i^s)), \tag{4}$$

wherein $y_i^s$ may denote the tag assigned to the i-th token in the input sequence $x=(x_1, \ldots, x_T)$ and $W_{hy}^s$ may denote a weight matrix.

Moreover, the jointly trained machine learning model may determine the intent of the input sequence $x=(x_1, \ldots, x_T)$ including by generating an intent context vector $c^I$ based on a last hidden state $h_T$ of the jointly trained machine learning model. As shown in Equation (5) below, the intent context vector $c^I$ may be determined in the same manner as the slot context vector $c^s$.

$$y^I = \mathrm{softmax}(W_{hy}^I(h_T + c^I)), \tag{5}$$

The jointly trained machine learning model may be trained based at least on training data that includes text that have been assigned ground truth labels. For example, each named entity included in the text may be assigned a tag indicating the ground truth category of each named entity. Furthermore, the text may be assigned one or more tags indicating the ground truth intent associated with the text.

The joint training of the machine learning model may include processing the training data with the machine learning model and optimizing the machine learning model based at least on an error in the output of the machine learning model relative to the ground truth labels included with the training data.

In some example embodiments, the joint training the machine learning model may include optimizing the objective expressed as Equation (6) below.

$$p(y^s, y^I | x) = p(y^I | x) \Pi_{i=1}^T p(y_i^s | x) \tag{6}$$

wherein $p(y^s, y^I | x)$ may denote the conditional probability of a result of the slot filling $y^s$ and intention prediction $y^I$ given the input sequence $x=(x_1, \ldots, x_T)$. The joint training of the machine learning model may include maximizing the value of the conditional probability $p(y^s, y^I | x)$ including by adjusting the slot attention weights $a_{i,j}^s$ to at least minimizing an error in an output of the machine learning model relative to the ground truth labels included in the training data.

Figure 4A:
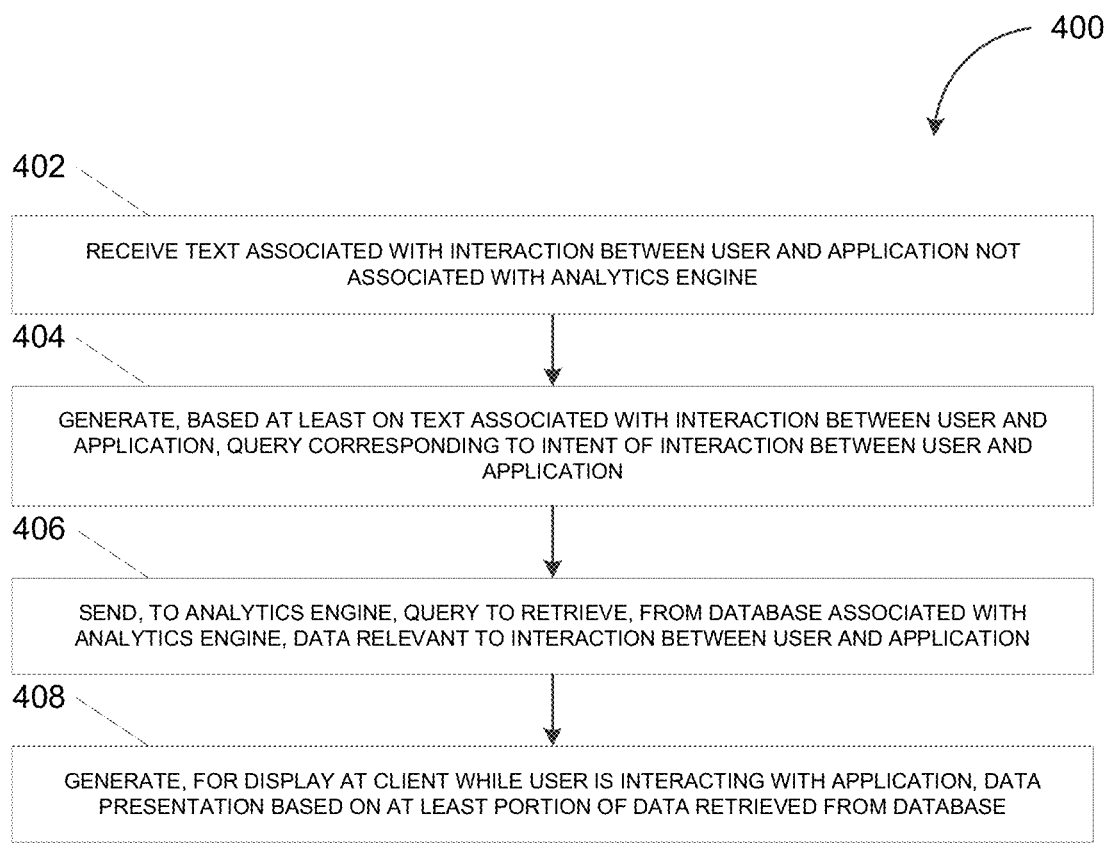
FIG. 4A depicts a flowchart illustrating a process for accessing an analytics engine, in accordance with some example embodiments.

FIG. 4A depicts a flowchart illustrating a process 400 for accessing an analytics engine, in accordance with some example embodiments. Referring to FIGS. 1, 2A-D, 3, and 4A, the plug-in 160 may perform the process 400 in order to provide, to the user 125 at the client 120, access to the analytics engine 110 while the user 125 is interacting with the application 150 not associated with the analytics engine 110.

At 402, the plug-in 160 may receive a text associated with an interaction between the user 125 and the application 150 not associated with the analytics engine 110. For example, the plug-in 160 may receive the first email 200a and/or the second email 200b being accessed by the user 125 at the client 120. The user 125 may access the first email 200a and/or the second email 200b while interacting with the application 150, which may be a third-party email client not associated with the analytics engine 110. The user 125 may require access to the analytics engine 110 including, for example, to at least a portion of data stored in the database 130 associated with the analytics engine 110.

At 404, the plug-in 160 may generate, based at least on the text associated with the interaction between the user 125 and the application 150, a query corresponding to an intent of the interaction between the user 125 and the application 150. For example, the plug-in 160 may apply one or more machine learning models in order to generate a query corresponding to the intent of the interaction between the user 125 and the application 150. The one or more machine learning models may be trained to determine the intent of the interaction between the user 125 and the application 150 based at least on one or more named entities included in the text associated with the interaction between the user 125 and the application 150. Furthermore, the one or more machine learning models may be trained to slot fill a template query including by mapping, to the corresponding slots in the template query, the one or more named entities included in the text associated with the interaction between the user 125 and the application 150.

At 406, the plug-in 160 may send, to the analytics engine 110, the query to retrieve, from the database 130 associated with the analytics engine 110, data relevant to the interaction between the user 125 and the application 150. As noted, the query may be generated to correspond to the intent of the interaction between the user 125 and the application 150. Moreover, in some example embodiments, the plug-in 160 may send the query to the analytics engine 110 through an application programming interface (API) such as representational state transfer (REST), simple object access protocol (SOAP), and/or the like.

At 408, the plug-in 160 may generate, for display at the client 120 while the user 125 is interacting with the application 150, a data presentation based on at least a portion of the data retrieved from the database 130. In some example embodiments, the plug-in 160 may generate, based on at least a portion of the data retrieved from the database 130, a data presentation including, for example, a chart, a graph, a table, a diagram, and/or the like. The data presentation may be displayed at the client 120 as part of a graphic user interface (GUI). Moreover, the data presentation may provide a visual representation of at least a portion of the data retrieved from the database 130 that is relevant to the interaction between the user 125 and the application 150.

Figure 4B:
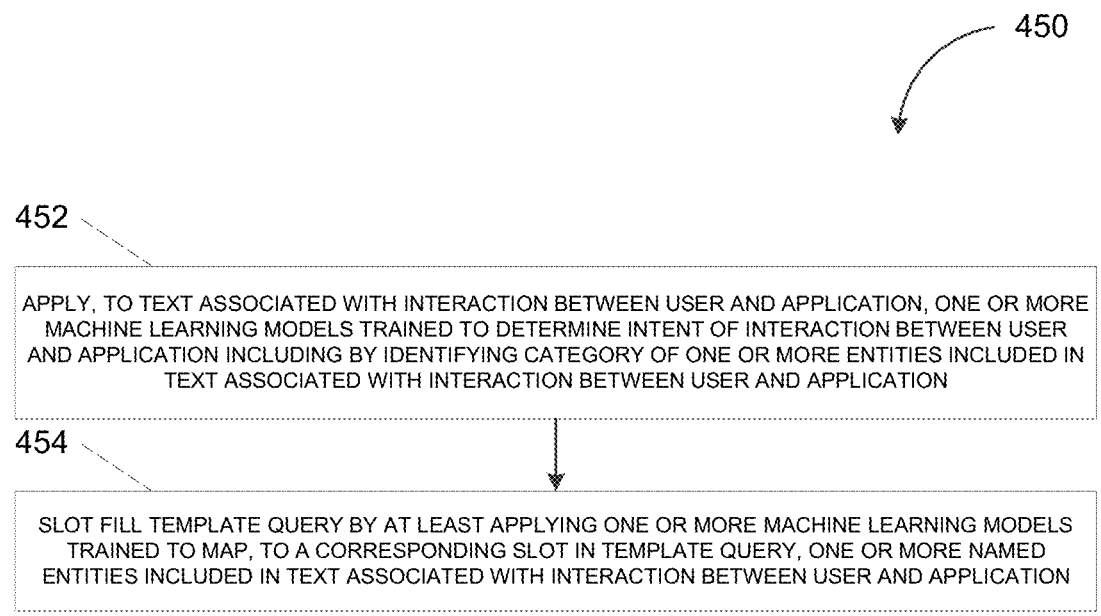
FIG. 4B depicts a flowchart illustrating a process for generating a query to retrieve data from a database associated with an analytics engine, in accordance with some example embodiments.

FIG. 4B depicts a flowchart illustrating a process 450 for generating a query to retrieve data from a database associated with an analytics engine, in accordance with some example embodiments. Referring to FIGS. 1, 2A-D, 3, and 4A-B, the process 450 may implement operation 404 of the process 400. For example, the plug-in 160 may perform the process 450 in order to generate a query to retrieve, from the database 130 associated with the analytics engine 110, data relevant to the interaction between the user 125 and the application 150.

At 452, the plug-in 160 may apply, to the text associated with the interaction between the user 125 and the application 150, one or more machine learning models trained to determine an intent of the interaction between the user 125 and the application 150 including by identifying a category of one or more named entities included in the text associated with the interaction between the user 125 and the application 150. For example, the plug-in 160 may apply the one or more machine learning models in order to assign, to each token in the text corresponding to a named entity, a tag corresponding to the category of the named entity. Examples of categories of named entities may include names, organization, a location, a time expression, a medical code, a quantity, a monetary value, a percentage, and/or the like. The one or more machine learning models may be further trained to determine an intent of the interaction between the user 125 and the application 150 based at least on the In some example embodiments, the plug-in 160 may apply, to the text associated with the interaction between the user 125 and the application 150, multiple machine learning models that have been separately trained to determine the intent of the text and map the named entities included in the text to the corresponding slots in the template query. For example, the plug-in 160 may apply, to the text associated with the interaction between the user 125 and the application 150, a first machine learning model (e.g., a support vector machine (SVM), a neural network, and/or the like) trained determine the intent of the text including by identifying the categories of the named entities included in the text. Alternatively and/or additionally, the plug-in 160 may apply, to the text associated with the interaction between the user 125 and the application 150, a single machine learning model that is jointly trained to determine the intent of the text and map the named entities included in the text to the corresponding slots in the template query. For instance, the plug-in 160 may apply, to the text associated with the interaction between the user 125 and the application 150, an attention-based bidirectional recurrent neural network and/or the like.

At 454, the plug-in 160 may slot fill a template query by at least applying one or more machine learning models trained to map, to a corresponding slot in the template query, the one or more named entities included in the text associated with the interaction between the user 125 and the application 150. As noted, the the plug-in 160 may apply, to the text associated with the interaction between the user 125 and the application 150, multiple machine learning models that have been separately trained to determine the intent of the text and map the named entities included in the text to the corresponding slots in the template query. Accordingly, the plug-in 160 may apply, to the text associated with the interaction between the user 125 and the application 150, a second machine learning model (e.g., a maximum entropy Markov model (MEMM), a conditional random fields (CRF) model, a recurrent neural network (RNN), and/or the like) trained to map, to the corresponding slots in a template query, the named entities included in the text. Alternatively and/or additionally, the plug-in 160 may apply, to the text associated with the interaction between the user 125 and the application 150, a single machine learning model that is jointly trained to determine the intent of the text and map the named entities included in the text to the corresponding slots in the template query. For example, the plug-in 160 may apply, to the text associated with the interaction between the user 125 and the application 150, an attention-based bidirectional recurrent neural network and/or the like.

Figure 5:
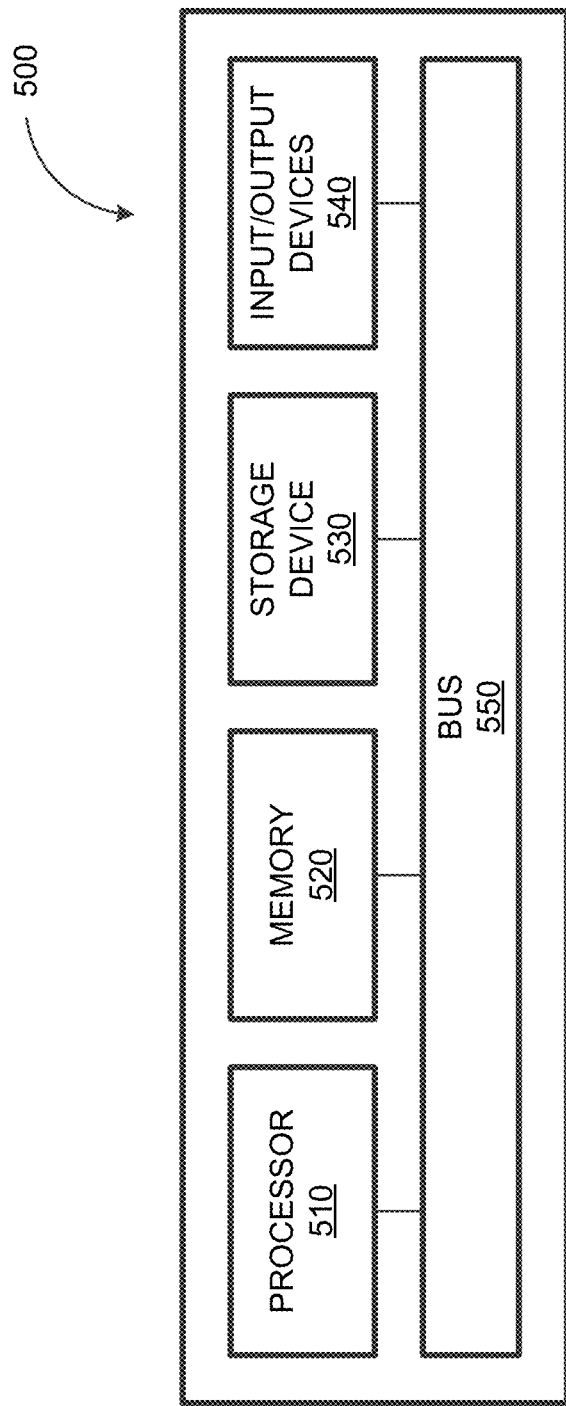
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1, 2A-D, 3, 4A-B, and 5, the computing system 500 can be used to implement the analytics engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the analytics engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text, the mapping being performed based at least on the intent of the interaction between the user and the application, and the query being generated by at least inserting, based at least on the mapping, a token corresponding to the one or more named entities included in the first text in the corresponding slot in the template query;

sending, to an analytics engine, the query to at least retrieve, from a database associated with the analytics engine, data relevant to the interaction between the user and the application; and generating, for display at a client associated with the user, a data presentation providing a visual representation of at least a portion of the data retrieved from the database.

2. The system of claim 1, wherein the one or more machine learning models include a first machine learning model trained to determine the intent of the interaction between the user and the application, and wherein the one or more machine learning models further include a second machine learning model trained to map, to the corresponding slot in the template query, the one or more named entities included in the first text.

3. The system of claim 2, wherein the first machine learning model comprises a support vector machine and/or a neural network, and wherein the second machine learning model comprises a maximum entropy Markov model, a conditional random fields model, and/or a recurrent neural network.

4. The system of claim 1, wherein the one or more machine learning models include a machine learning model that is jointly trained to determine the intent of the interaction between the user and the application and to map, to the corresponding slot in the template query, the one or more named entities included in the first text.

5. The system of claim 4, wherein the machine learning model comprises an attention-based bidirectional recurrent neural network.

6. The system of claim 1, wherein the one or more machine learning models is further trained to determine the intent of the interaction between the user and the application by at least identifying a category for each of the one or more named entities included in the first text.

7. The system of claim 6, wherein the category includes a name, an organization, a location, a time expression, a medical code, a quantity, a monetary value, or a percentage.

8. The system of claim 1, further comprising:
training, based at least on training data, the one or more machine learning models, the training data including a second text associated with a first tag indicating a ground truth category of a named entity included in the second text and a second tag indicating a ground truth intent of the second text.

9. The system of claim 1, wherein the data presentation comprises a chart, a graph, a table, and/or a diagram.

10. The system of claim 1, wherein the application comprises a web application, an email client, or a message client, and wherein the application is not associated with the analytics engine.

11. The system of claim 1, wherein the application comprises a web application, an email client, or a message client, and wherein the application is not associated with the analytics engine.

12. A computer-implemented method, comprising:
generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text, the mapping being performed based at least on the intent of the interaction between the user and the application, and the query being generated by at least inserting, based at least on the mapping, a token corresponding to the one or more named entities included in the first text in the corresponding slot in the template query;

sending, to an analytics engine, the query to at least retrieve, from a database associated with the analytics engine, data relevant to the interaction between the user and the application; and generating, for display at a client associated with the user, a data presentation providing a visual representation of at least a portion of the data retrieved from the database.

13. The method of claim 12, wherein the one or more machine learning models include a first machine learning model trained to determine the intent of the interaction between the user and the application, and wherein the one or more machine learning models further include a second machine learning model trained to map, to the corresponding slot in the template query, the one or more named entities included in the first text.

14. The method of claim 13, wherein the first machine learning model comprises a support vector machine and/or a neural network, and wherein the second machine learning model comprises a maximum entropy Markov model, a conditional random fields model, and/or a recurrent neural network.

15. The method of claim 12, wherein the one or more machine learning models include a machine learning model that is jointly trained to determine the intent of the interaction between the user and the application and to map, to the corresponding slot in the template query, the one or more named entities included in the first text.

16. The method of claim 15, wherein the machine learning model comprises an attention-based bidirectional recurrent neural network.

17. The method of claim 12, wherein the one or more machine learning models is further trained to determine the intent of the interaction between the user and the application by at least identifying a category for each of the one or more named entities included in the first text.

18. The method of claim 17, wherein the category includes a name, an organization, a location, a time expression, a medical code, a quantity, a monetary value, or a percentage.

19. The method of claim 12, further comprising:
training, based at least on training data, the one or more machine learning models, the training data including a second text associated with a first tag indicating a ground truth category of a named entity included in the second text and a second tag indicating a ground truth intent of the second text.

20. A non-transitory computer readable medium storing instructions, which when executed by at least one data processor, result in operations comprising:
   generating, based at least on a first text associated with an interaction between a user and an application, a query corresponding to an intent of the interaction between the user and the application, the query being generated by at least applying one or more machine learning models to the first text, the one or more machine learning models being trained to determine the intent of the interaction between the user and the application, and the one or more machine learning models further being trained to generate the query by at least mapping, to a corresponding slot in a template query, one or more named entities included in the first text, the mapping being performed based at least on the intent of the interaction between the user and the application, and the query being generated by at least inserting, based at least on the mapping, a token corresponding to the one or more named entities included in the first text in the corresponding slot in the template query;
   sending, to an analytics engine, the query to at least retrieve, from a database associated with the analytics engine, data relevant to the interaction between the user and the application; and
   generating, for display at a client associated with the user, a data presentation providing a visual representation of at least a portion of the data retrieved from the database.

* * * * *